(12) United States Patent
Herrell et al.

(10) Patent No.: US 7,650,275 B2
(45) Date of Patent: Jan. 19, 2010

(54) VIRTUALIZATION OF A PARITION BASED ON ADDRESSES OF AN I/O ADAPTER WITHIN AN EXTERNAL EMULATION UNIT

(75) Inventors: Russ Herrell, Fort Collins, CO (US); Gerald J. Kaufman, Jr., Fort Collins, CO (US); John A. Morrison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

(21) Appl. No.: 11/039,621

(22) Filed: Jan. 20, 2005

(65) Prior Publication Data
US 2006/0161419 A1 Jul. 20, 2006

(51) Int. Cl.
G06G 7/48 (2006.01)
G06F 9/44 (2006.01)
G06F 13/10 (2006.01)
G06F 13/12 (2006.01)
G06F 9/455 (2006.01)

(52) U.S. Cl. .............................. 703/25; 703/4; 703/21; 718/1

(58) Field of Classification Search .................. 703/26, 703/23, 4, 21, 25; 718/1
See application file for complete search history.

(56) References Cited

U.S. PATENT DOCUMENTS 4,707,803 A * 11/1987 Anthony et al. ............... 703/25
5,375,225 A * 12/1994 Dean et al. ................... 703/25
5,748,468 A * 5/1998 Notenboom et al. ........... 700/3
2003/0188278 A1* 10/2003 Carrie ............................ 716/4
2003/0204648 A1* 10/2003 Arndt ............................ 710/5
2004/0230735 A1* 11/2004 Moll ........................... 710/312
2004/1023073 * 11/2004 Moll ........................... 710/312
2005/0010880 A1* 1/2005 Schubert et al. ................. 716/4

FOREIGN PATENT DOCUMENTS

EP 0372833 A3 11/1989
EP 0372833 A3 * 11/1989
EP 0495254 A1 1/1991
GB 2201533 A * 9/1988

OTHER PUBLICATIONS http://web.archive.org/web/20020525010638/http://www.computerhope.com/jargon/d/datapack.htm to May 2002, via Wayback Machine.*
http://web.archive.org/web/20030605044241/http://intel.com/technology/pciexpress/devnet/docs/WhatisPCIExpress.pdf Supported by wayback machine to Jun. 2003.*
http://web.archive.org/web/20030817132306/http://www.micro2000uk.co.uk/hardware_glossary.htm supported to Aug. 17, 2003 by Waybkac Machine.*
European Search Report for Application No. GB0525954.4 mailed on Mar. 31, 2006.

* cited by examiner

Primary Examiner—David R Vincent
Assistant Examiner—Ben M Rifkin

(57) ABSTRACT

Systems, methodologies, media, and other embodiments associated with external virtualization are described. One exemplary system embodiment includes an emulation logic located external to an integrated circuit to which it may be operably connected. The example emulation logic may include a virtualization logic that is configured to virtualize a portion of a function performed by the integrated circuit. The portion may be identifiable by an address associated with the portion. The example emulation logic may also include a data store that is operably connected to the virtualization logic and that is configured to store a state data associated with virtualizing the portion of the function.

30 Claims, 13 Drawing Sheets

VIRTUALIZATION OF A PARITION BASED ON ADDRESSES OF AN I/O ADAPTER WITHIN AN EXTERNAL EMULATION UNIT

BACKGROUND

Computers may emulate hardware to provide the appearance of hardware that does not actually exist to an operating system, application, logic, or process. Computers may also use emulation to partition one hardware function between multiple operating systems, applications, and so on. This emulation may also be referred to as virtualization.

Virtualization may be accomplished by mechanisms including, for example, pure software virtualization, hardware supported software virtualization, and so on. Software virtualization tends to produce general performance penalties, even when the virtualized hardware is not being employed. However, software virtualization does facilitate emulating hardware on a variety of processors, particularly if the virtualization code is written in a portable, structured manner. Hardware virtualization tends to require hardware functions to be designed into an underlying chip. Designing in virtualization hardware functions may increase the size, complexity, design time, cost, time to market, and so on, of a chip set. Furthermore, if a chip set does not initially support virtualization, it may be difficult, if not impossible to "add-on" virtualization. Additionally, if the built-in virtualization hardware functions are not employed, they still consume chip real estate, power, and so on.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
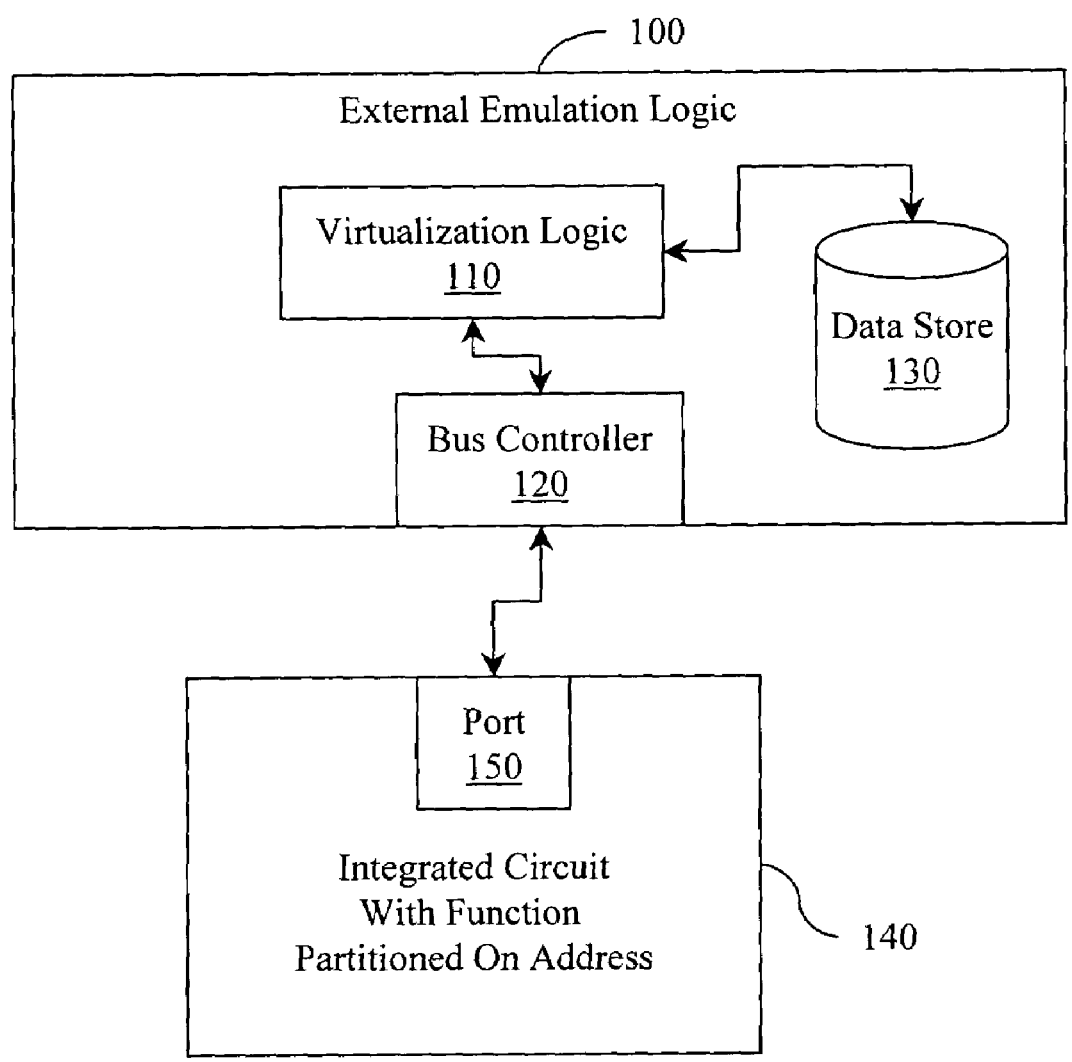
FIG. 1 illustrates an example external emulation logic providing chip hardware virtualization.

Some example systems and methods described herein concern providing hardware support for virtualization external to a chip that was not designed to support virtualization. Thus, virtualization may be provided for computer chips that were not designed to support virtualization. Therefore, chips may be designed for use in systems that both do and do not support virtualization, which may facilitate improving economies of scale by amortizing fixed development costs over larger production volumes. External virtualization functions may be relatively small and thus may be implemented, for example, in a field programmable gate array (FPGA).

Some example systems and methods concern providing chip hardware virtualization via external emulation when a chip function may be partitioned via addressing. For example, a host bridge in an input/output adapter chip may be configured to process configuration transactions and data (e.g., read/write) transactions. In one example, the configuration transactions may be associated with a first address or set of addresses while the data transactions may be associated with a second address or set of addresses. An address aware logic like a crossbar may facilitate routing the configuration transactions to an external emulation logic, while allowing the data transactions to proceed directly to the host bridge. The external emulation logic may virtualize the host bridge and present a virtual host bridge to transaction producers. The external emulation logic may be operably connected to the input/output adapter chip through a port like a management port.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks, and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. A logic may include one or more gates, combinations of gates, or other circuit components. A logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected and that may facilitate transferring information.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically and/or statically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Other forms may also be used.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an external emulation logic 100 providing chip hardware virtualization. The emulation logic 100 is configured to be located outside an integrated circuit 140. The integrated circuit 140 may implement, for example, a function that can be partitioned by addressing. Partitioning a function by addressing means, in the context of this application, being able to identify different subsets of a total set of functionality provided by a chip function, where the identifying is based on an address associated with performing the function. By way of illustration, in an integrated circuit employed in a memory-mapped input/output environment, the integrated circuit may implement a physical device that performs both configuration and data moving functions. Thus, configuration functions may be addressed to configuration registers while data moving functions may be addressed to input/output registers, and so on. By way of further illustration, for an integrated circuit that receives transactions in a cellular architecture, point-to-point architecture, and the like, transactions may have addresses that identify a target. For example, configuration transactions may be mapped to a first set of target addresses while data moving transactions may be mapped to a second set of target addresses. Thus, the overall set of functionality provided by an integrated circuit may be partitioned, for example, into a configuration subset and a data moving subset, where the two subsets can be partitioned by the addresses associated with the ports and/or transactions associated with the functions. While configuration and data moving functions are described it is to be appreciated that other functions may be employed.

Emulation logic 100 may include a bus controller 120 that is configured to receive a transaction from the integrated circuit 140. The transaction may be provided to the bus controller 120 by a port 150 (e.g., management port) located on the integrated circuit 140. As described above, the transaction may include an address that facilitates identifying whether the transaction is a member of a subset of transactions virtualized by the emulation logic 100.

Emulation logic 100 may also include a virtualization logic 110 that is operably connected to the bus controller 120. The virtualization logic 110 may be configured to virtualize a portion of the functionality provided by integrated circuit 140. For example, the total functionality provided by integrated circuit 140 may include both configuration and data moving functions. Thus, the virtualization logic 110 may, for example, virtualize the configuration portion of the total functionality. In one example, the portion that is virtualized may be identifiable by an address associated with a transaction associated with the portion. For example, configuration transactions may be mapped to a first set of addresses (e.g., configuration ports) while data moving transactions may be mapped to a second set of addresses (e.g., input/output ports). While configuration and data moving functionality are described, more generally the total functionality provided by integrated circuit 140 may be described as control functions and operation functions. Thus, the sets of addresses may include, for example, operation addresses, and control addresses. The operation addresses may include, for example, an input port address, and an output port address. The control addresses may include, for example, a configuration port address.

Emulation logic 100 may also include a data store 130 that is operably connected to the virtualization logic 110. The data store 130 may be configured to store a state data associated with the virtualized portion of the total functionality provided by the integrated circuit 140. Emulation logic 100 may be implemented, for example, in a single chip like a field programmable gate array.

The integrated circuit 140 may implement a physical device. Thus, the virtualization logic 110 may be configured to provide a virtual device related to the physical device provided by the integrated circuit 140. For example, if the integrated circuit 140 implements a host bridge, then the virtualization logic 110 may virtualize portions of the host bridge. In one example, the virtualization logic 110 may provide multiple instances of a virtual device that virtualizes the physical device provided by the integrated circuit 140. Thus, in one example, the virtualization logic 110 and the data store 130 may be configured to isolate state data associated with a first instance of the virtual device from state data associated with a second instance of the virtual device provided by the emulation logic 100. While two instances are described, it is to be appreciated that a greater and/or lesser number of instances may be employed.

Figure 2:
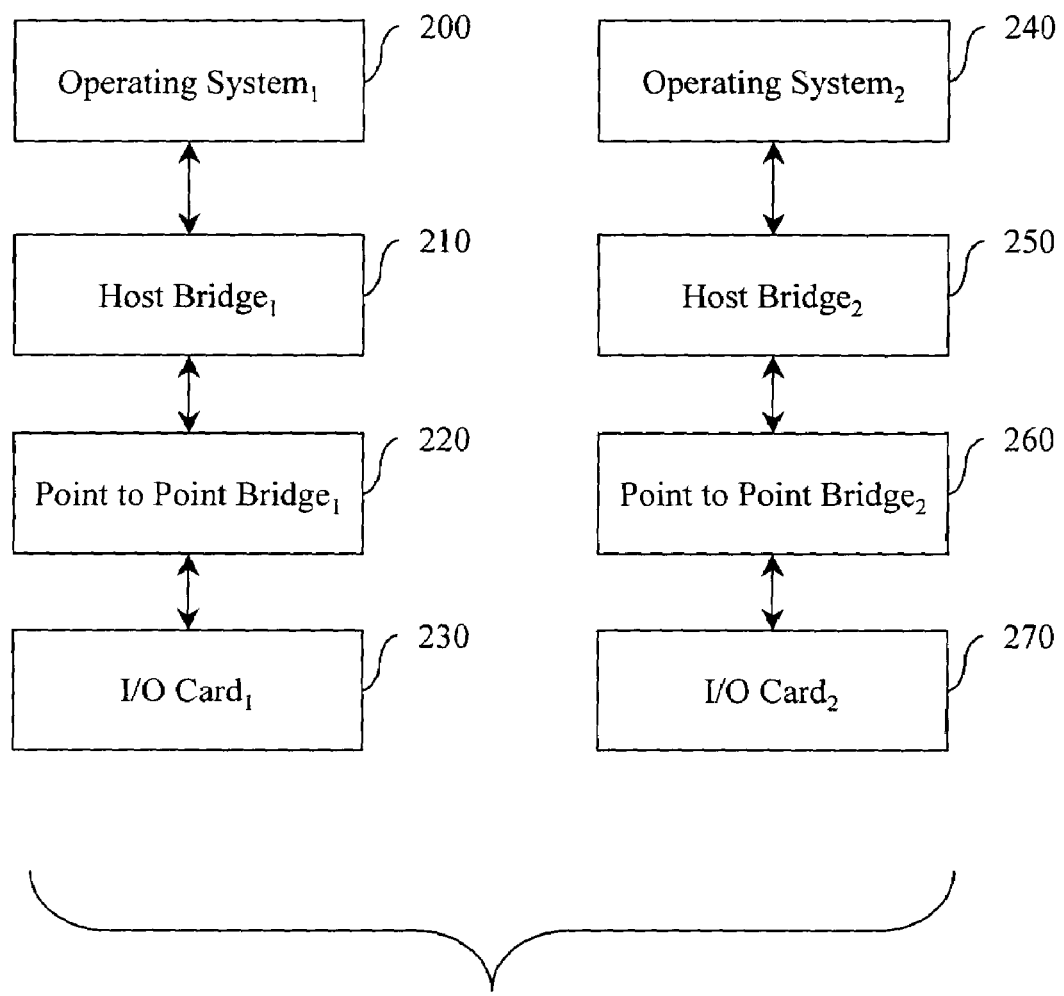
FIG. 2 illustrates an example virtual data flow provided by an example external emulation logic providing chip hardware virtualization.

FIG. 2 illustrates two virtual data flows that may be provided by an external emulation logic providing chip hardware virtualization. In a first flow, an operating system$_1$ 200 that may be located in a first partition on a machine may provide data (e.g., transactions) to a host bridge$_1$ 210. Similarly, in a second flow, an operating system$_2$ 240 may be located in a second partition on the machine. Operating system$_2$ 240 may provide data (e.g., transactions) to a second host bridge$_2$ 250. It may appear to operating system$_1$ 200 that there is a direct, physical connection between operating system$_1$ 200 and host bridge$_1$ 210. Similarly, it may appear to operating system$_2$ 240 that there is a direct, physical connection between operating system$_2$ 240 and host bridge$_2$ 250. Furthermore, it may appear to operating system$_1$ 200 and operating system$_2$ 240 that each operating system has an actual host bridge available to it. However, virtualization systems like those implemented in external hardware as described herein may actually virtualize a single host bridge and provide the two instances, host bridge$_1$ 210 and host bridge$_2$ 250, to the operating systems.

Figure 3:
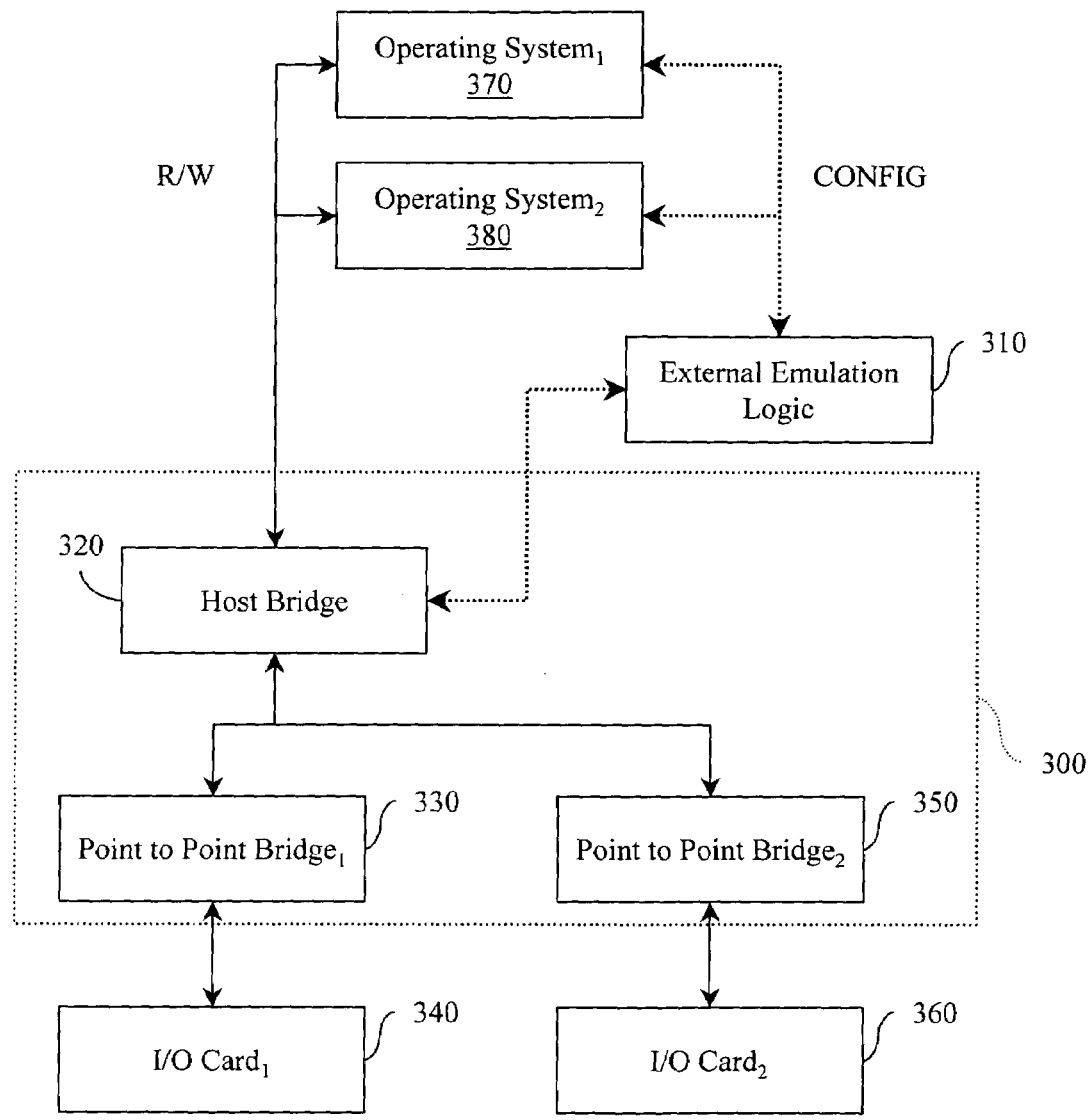
FIG. 3 illustrates an example address based partitioning of transactions associated with chip hardware virtualization via external emulation.

Thus, operating system$_1$ 200 may also operate assuming that host bridge$_1$ 210 is directly, physically connected to a point to point bridge$_1$ 220 and thus to an input/output card$_1$ 230. Similarly, operating system$_2$ 240 may operate assuming that host bridge$_2$ 250 is directly, physically connected to point to point bridge$_2$ 260 and thus to input/output card$_2$ 270. While FIG. 2 illustrates a pair of virtual flows that a pair of operating systems may be presented with, FIG. 3 illustrates an actual flow that may occur as a result of address based partitioning of transactions associated with chip hardware virtualization via external emulation. Furthermore, while FIG. 2 illustrates bridges and input/output cards, it is to be appreciated that external emulation hardware may facilitate producing virtual flows for other hardware.

FIG. 3 illustrates a system that includes an integrated circuit 300 that implements a physical device that is configured to perform a physical operation. The physical operation may be divided into two or more subsets of physical operations. The subsets may be partitioned by addressing. Thus, if integrated circuit 300 is configured to implement a host bridge 320 that is operably connected to a point to point bridge$_1$ 330 and a point to point bridge$_2$ 350, the subsets may include configuration functions and data moving (e.g., read/write) functions. The point to point bridge$_1$ 330 can be connected to an input/output card$_1$ 344) and the point to point bridge$_2$ 350 can be connected to an input/output card$_2$ 360.

The system may also include an emulation logic 310 that is located outside the integrated circuit 300. The emulation logic 310 is illustrated being operably connectable to the integrated circuit 300. In one example, the emulation logic 310 may be a field programmable gate array or other similar chip that is operably connected to the integrated circuit 300 through a management port on the integrated circuit 300. The emulation logic 310 may be configured to virtualize at least one of the subsets of physical operations provided by the integrated circuit 300. For example, the emulation logic 310 may virtualize configuration operations performed by host bridge 320. The operations may be partitioned, for example, based on addresses associated with a configuration port, an input port, an output port, and so on. Thus, when a transaction arrives in the integrated circuit 300 from an operating system, an address associated with the transaction may be examined to determine whether to provide the transaction to the host bridge 320 or to the external emulation logic 310.

To facilitate determining whether a transaction should be provided to the host bridge 320 or to the external emulation logic 310, the integrated circuit 300 may include, for example, a crossbar (not illustrated) that is configured to route a first set of transactions associated with the at least one subset of physical operations to the emulation logic 310 and to not route a second set of transactions that are not associated with the at least one subset of physical operations to the emulation logic 310. Thus, a virtual read/write flow (R/W) may proceed from operating system$_1$ 370 and operating system$_2$ 380 to the integrated circuit 300 while a virtual configuration flow (CONFIG) may proceed from operating system$_1$ 370 and operating system$_2$ 380 to the external emulation logic 310 by way of the integrated circuit 300. Note that integrated circuit 300 may not have been designed to support virtualization but virtualization is provided by partitioning the functions performed by integrated circuit 300 and having a subset of the functions routed to external emulation logic 310. External emulation logic 310 may, for example, receive the transaction, make state changes in response to the transaction, and provide a related transaction(s) to the integrated circuit 300.

In one example, emulation logic 310 may include a data store (not illustrated) that is configured to store a state data associated with virtualizing the at least one subset of physical operations. For example, the data store may store state data associated with a first instance of host bridge 320 provided to operating system$_1$ 370 and may also store state data associated with a second instance of host bridge 320 provided to operating system$_2$ 380. The data store may be configured to keep these two sets of state data separate from each other, which facilitates preventing one operating system from interfering with the operation of another operating system.

Figure 4:
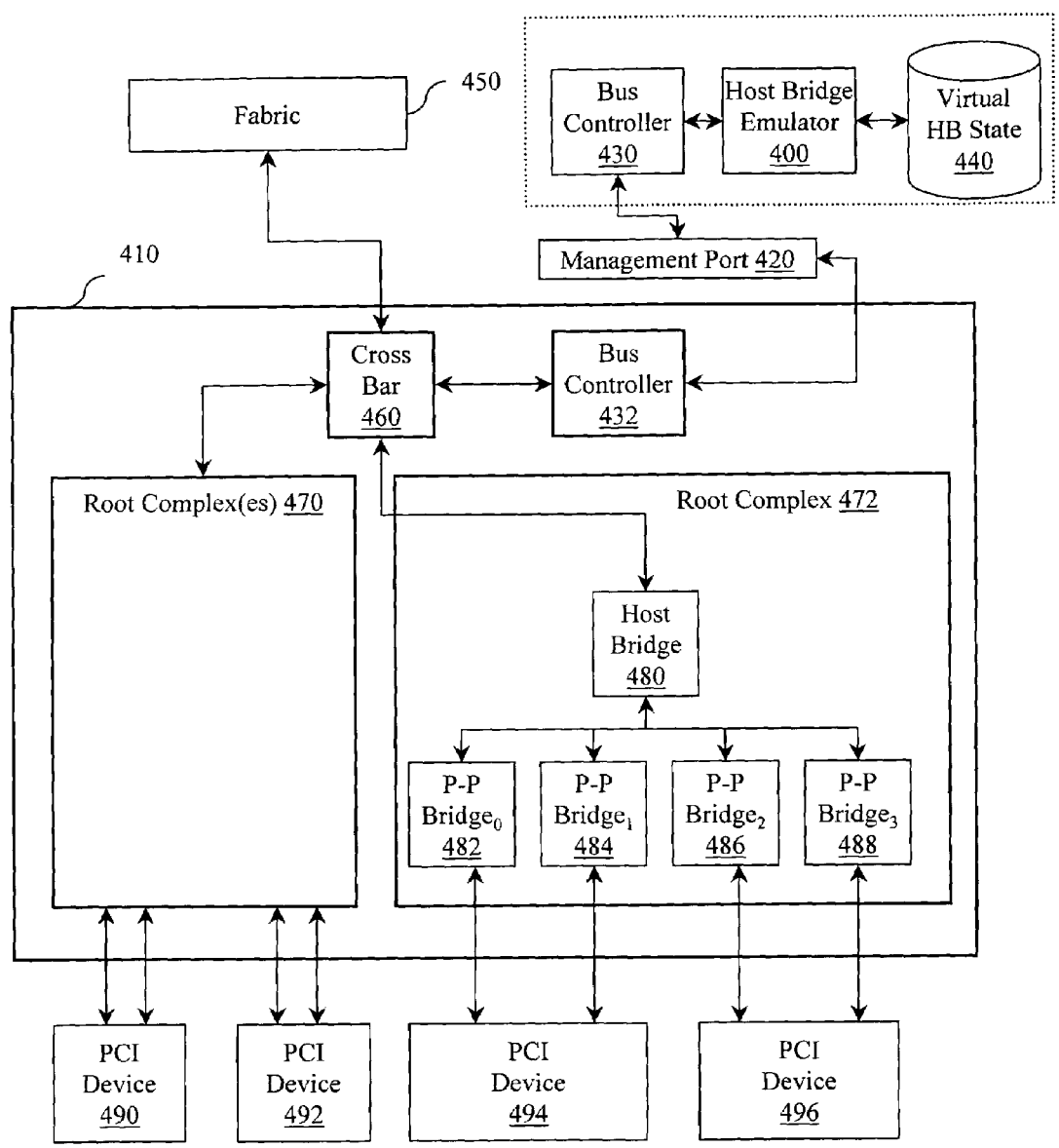
FIG. 4 illustrates example host bridge emulation via external emulation.

FIG. 4 illustrates an example host bridge emulator 400 providing external emulation for a host bridge 480. In FIG. 4, an input/output adapter chip 410 includes multiple root complexes 470, 472. While two root complexes are illustrated, it is to be appreciated that an input/output adapter chip could provide a greater and/or lesser number of root complexes. Root complex 472 includes a host bridge 480, which supports multiple input/output cards 494 through 496 via multiple point-to-point (P-P) bridges 482 through 488. For example, P-P bridge$_0$ 482 and P-P bridge$_1$ 484 may be operably connected to a peripheral component interconnect (PCI) device 494. Similarly, P-P bridge$_2$ 486 and P-P bridge$_3$ 488 may be operably connected to a PCI device 496. While four P-P bridges operably connected, two at a time, to two PCI devices are illustrated, it is to be appreciated that a greater and or lesser number of P-P bridges and/or PCI devices could be employed. It is to be appreciated that root complex 470 may contain internal components similar to those illustrated for root complex 472. For example, the components of root complex 470 can be operably connected to similar PCI devices like PCI device 490 and PCI device 492.

It may be desired to assign one input/output card attached to root complex 472 to a first partition accessible through fabric 450 while assigning another input/output card attached to root complex 472 to a second partition accessible through fabric 450. However, having a single host bridge 480 may produce issues concerning isolating different partitions from each other. For example, host bridge 480 may contain state information for each of the P-P bridges it supports. The state information may be read and/or written by an operating system in a partition to configure an input/output path, an input/output card, and the like. However, it may be desirable to isolate an operating system in a first partition from an operating system in another partition so that neither can see nor manipulate an input/output path or card assigned to the other.

Thus, external logic like host bridge emulator 400 may be operably connected to the input/output adapter chip 410. The operable connection may include in its path, for example, a bus controller 430 external to the input/output adapter chip 410 and a bus controller 432 internal to the input/output adapter chip 410. Computer communications may occur between the two bus controllers via, for example, a management port 420. The management port 420 may be provided by the input/output adapter chip 410 to facilitate actions like controlling, configuring, debugging, error reporting, and so on performed by a computer management subsystem. In this example, however, management port 420 has been employed to operably connect the host bridge emulator 400 to the input/output adapter chip 410.

The host bridge emulator 400 may virtualize host bridge 480, presenting a virtual host bridge to the partitions to which the input/output cards have been assigned. The state information conventionally stored in host bridge 480 may, as part of the virtualization provided by host bridge emulator 400, be replicated, replaced, and otherwise manipulated by the host bridge emulator 400 and stored in data store 440.

In FIG. 4, system firmware (not illustrated) may, at boot time, present to operating systems in the two example partitions a host bridge with configuration space addresses mapped to the management port 420. The crossbar 460 may participate in this mapping. The host bridge emulator 400 may therefore receive configuration transactions from the operating systems in the two example partitions. The configuration transactions may have their addresses manipulated, for example, by a source decoder (not illustrated) that facilitates providing a port identifier for a transaction. For example, a source decoder may map an address range to a port and associate a port identifier with a transaction. Thus, crossbar 460 may route transactions based, at least in part, on a port identifier.

The host bridge emulator 400 may be configured to emulate the host bridges and to send configuration transactions corresponding to the configuration transactions received from the two operating systems to the actual host bridge 480. The configuration space of host bridge 480 may be divided, for example, into two disjoint sets corresponding to the configuration space of the two P-P bridge pairs. Data associated with the configuration space, with host bridge 480 state, and other actions associated with the virtualization may be stored in data store 440. Thus, external hardware like host bridge emulator 400 facilitates preventing an operating system associated with one partition from accessing configuration space data associated with another partition by, for example, examining addresses associated with configuration transactions. Configuration transactions having addresses associated with a first operating system in a first partition may be allowed to access configuration space data associated with a first host bridge virtualized by host bridge emulator 400 while configuration transactions having addresses associated with a second operating system in a second partition may be allowed to access configuration space data associated with a second host bridge.

Note that host bridge emulator 400 may, in some examples, only be provided with configuration transactions. Data transactions, like read/write transactions, may not be routed by crossbar 460 to the host bridge emulator 400. Thus, in this example, host bridge emulator 400 would not become part of the input/output data path between an input/output card and a logic accessing that input/output card. Therefore, in one example, an external host bridge emulator 400 operably connected to input/output adapter chip 410 through a low bandwidth port like management port 420 may have a minimal effect on overall input/output performance. Additionally, when the actions performed by host bridge emulator 400 are relatively small, being confined, for example, to handling configuration transactions, the host bridge emulator 400 may be implemented in a single chip like a field programmable gate array (FPGA).

While FIG. 4 illustrates virtualizing an internal chip function, it is to be appreciated that the logics illustrated in FIG. 4 may facilitate providing other functionality. For example, the logics illustrated in FIG. 4 may facilitate working around design flaws in chip logic. For example, if there is a flaw in a configuration path associated with a chip, and configuration actions (e.g., transactions) can be intercepted based on addressing, then transactions associated with the flawed logic may be routed to external logic that may facilitate remedying the flaw. For example, the external logic may be configured to implement and present to a transaction producer like an operating system a correct function. The external logic may also be configured to emit transactions to the flawed logic in the chip that work around the design flaw. Thus, while FIG. 4 is specific to virtualizing a host bridge, it is to be appreciated that example systems and methods described herein relate more generally to virtualization associated with a chip containing a single function that may be partitioned via addressing.

Figure 5:
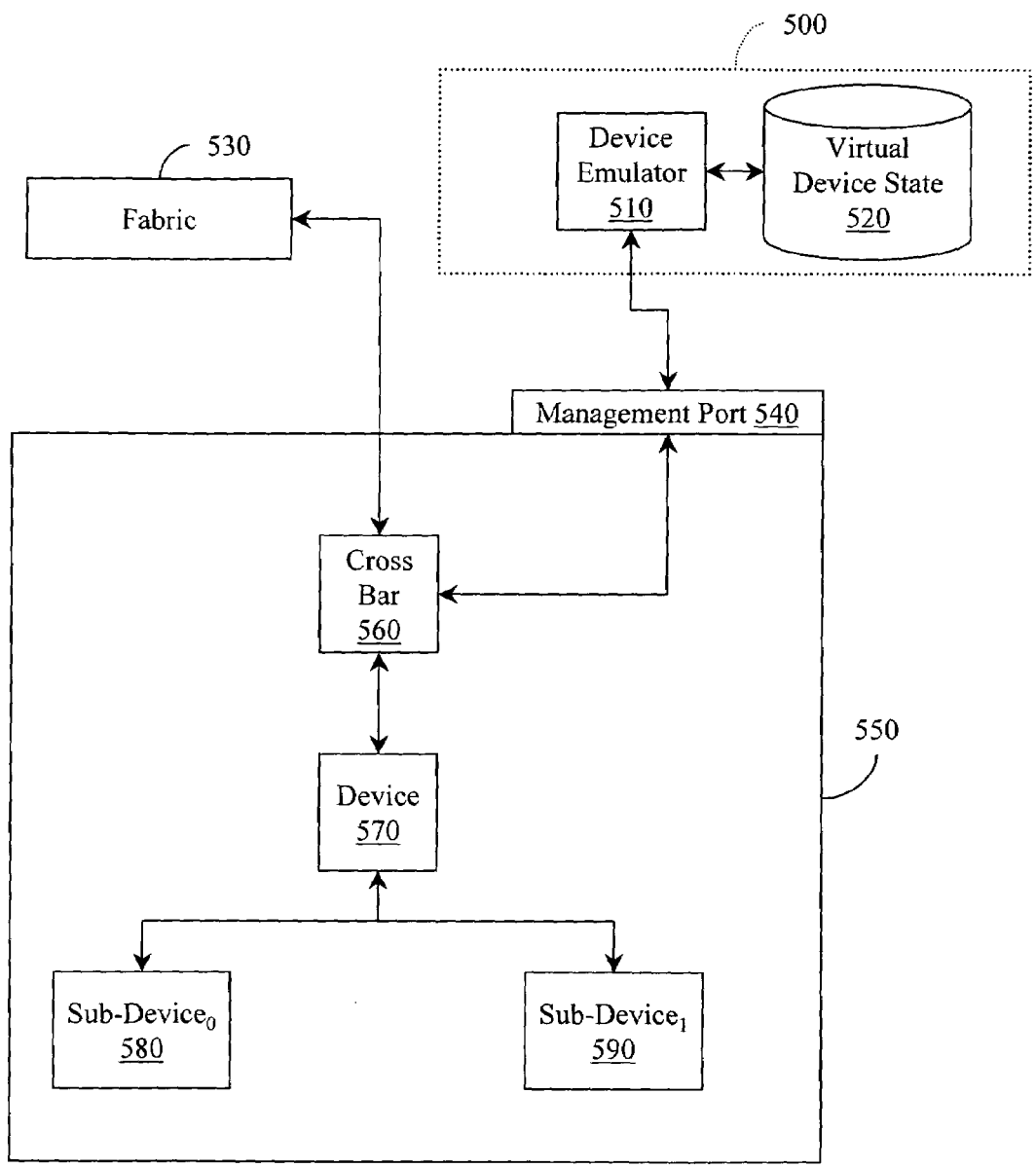
FIG. 5 illustrates example virtualization via external emulation hardware.

FIG. 5 illustrates a more general example of virtualization via external emulation hardware like that described in connection with FIG. 4. In FIG. 5, an external emulation logic 500 may include a device emulator 510 and a data store 520 that is configured to store virtual device state. Transactions from a fabric 530 may be delivered to the emulation logic 500 via a management port 540 located on an integrated circuit 550. Which transactions are routed to the external emulation logic 500 may be determined by cross bar 560.

For example, transactions may include addresses that facilitate partitioning functionality provided by a device 570. Some of the functionality may be virtualized by logic 500 and thus crossbar 560 may deliver transactions associated with the virtualized functionality to logic 500. However, some of the functionality may not be virtualized and thus crossbar 560 may deliver transactions associated with the non-virtualized functionality to device 570. Device 570 may be associated with other devices. For example a sub-device$_0$ 580 and a sub-device$_1$ 590 may be operably connected to device 570.

Example methods may be better appreciated with reference to the flow diagrams of FIGS. 6 through 8, 12, and 13. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. The processing blocks may represent a method step and/or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

Figure 6:
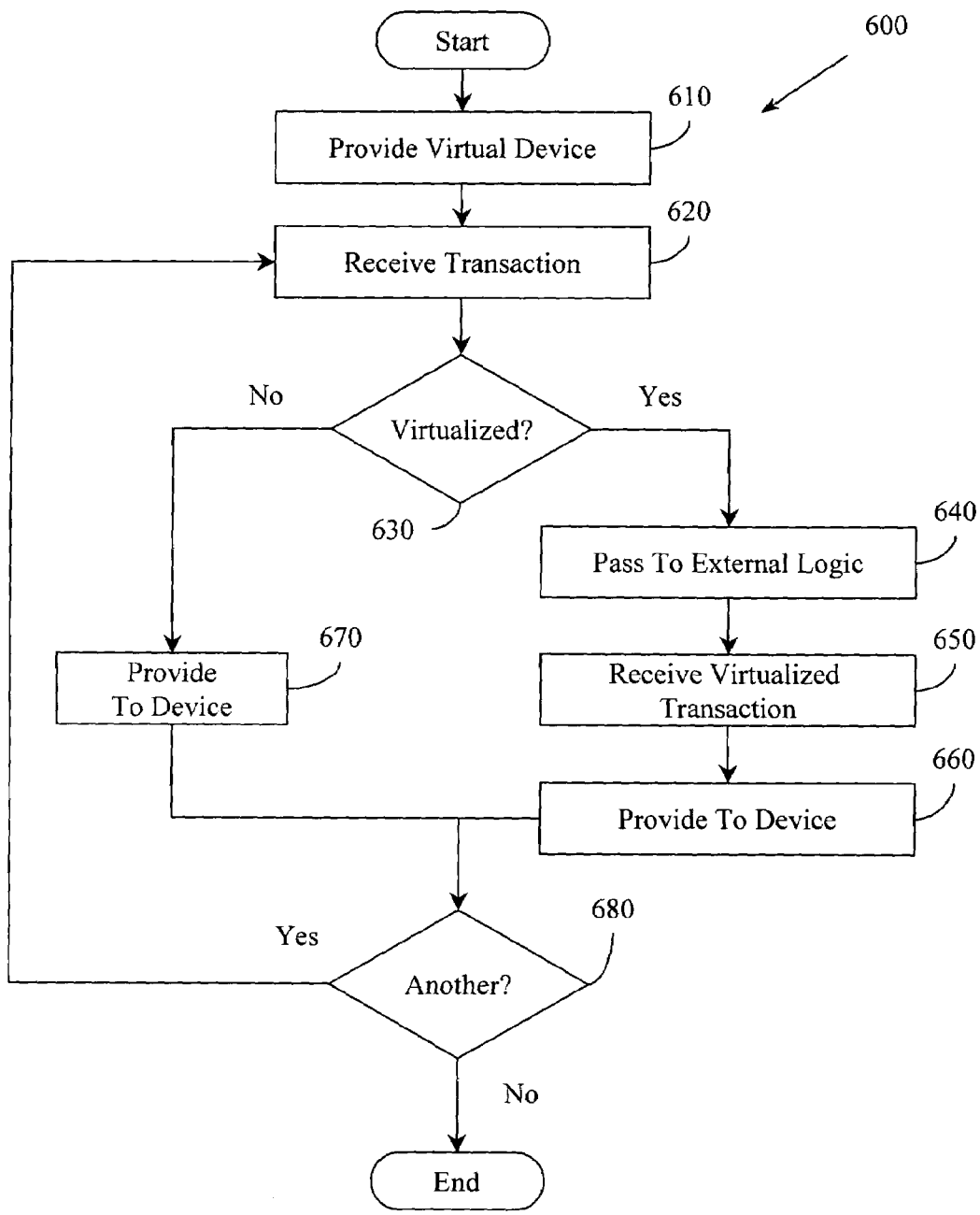
FIG. 6 illustrates an example method associated with providing chip hardware virtualization via external emulation.

FIG. 6 illustrates a method 600 associated with providing external virtualization support to an integrated circuit that implements a physical device, where the integrated circuit is configured without internal virtualization support. Method 600 may include, at 610, providing a virtual device that virtualizes a subset of functions provided by the physical device. The virtual device may be implemented in an external logic like a field programmable gate array. In one example, providing a virtual device may include providing a set of addresses implemented in the external logic to a transaction producer like an operating system, an application, and so on. The address may be associated with the subset of functions provided by the physical device and with a port.

Method 600 may also include, at 620, receiving in the integrated circuit a first transaction intended for the physical device. The transaction may be, for example, a member of a first set of transactions that are to be provided to the virtual device in the external logic or a member of a second set of transactions that are to be provided to the physical device virtualized by the virtual device.

Thus, method 600 may include, at 630, making a determination whether the first transaction is associated with the virtualized device, based, at least in part, on whether the first transaction is related by addressing to the subset of functions virtualized by the virtual device. If the first transaction is not related by addressing to the subset of functions virtualized by the virtual device, then it may be passed through to the physical device at 670. But if the first transaction is related by addressing to the subset of functions virtualized by the virtual device, then the first transaction may be provided, at 640, to the external logic.

In response to providing the first transaction to the external logic, a second transaction may be received in the integrated circuit at 650. The second transaction is provided by the external logic in response to being provided the first transaction. The second transaction may be, for example, a virtual transaction derived from the first transaction. Thus, the second transaction may be provided, at 660, to the physical device. While a second transaction is described, it is to be appreciated that in some examples, a first transaction may lead to zero, one, or more second transactions being received in the integrated circuit at 650 and provided to the physical device of 660. Thus, in some examples, method 600 is not limited to a one-to-one correspondence between first transactions and second transactions. At 680, a determination may be made concerning whether to process another transaction. If the determination is Yes, processing may return to 620, otherwise processing may conclude.

In one example, the subset of functions virtualized by the external logic may include a configuration function. Thus transactions associated with configuring a physical device may be passed to the external virtualization logic. Similarly, the subset of functions virtualized by the external logic may not include functions in an input/output data path associated with the physical device. Thus, input/output transactions may not be passed to the external virtualization logic.

While configuration and input/output are discussed in connection with FIG. 6, it is to be appreciated that method 600 may facilitate selectively virtualizing other functions. In one example, the subset of functions virtualized by the external logic may include an updated version of a previous version of the subset of functions in the integrated circuit. Thus, method 600 may facilitate providing a fix for a design flaw in the integrated circuit.

In one example, methodologies are implemented as processor executable instructions and/or operations provided on a computer-readable medium. Thus, in one example, a computer-readable medium may store processor executable instructions operable to perform a method for providing external virtualization support to an integrated circuit that implements a physical device, where the integrated circuit is configured without internal virtualization support. The method may include providing a virtual device that virtualizes a subset of functions provided by the physical device. The virtual device may be implemented in an external logic. The method may also include receiving in the integrated circuit a first transaction intended for the physical device and selectively providing the first transaction to the external logic based, at least in part, on whether the first transaction is related by addressing to the subset of functions virtualized by the virtual device. The method may also include receiving in the integrated circuit, from the external logic, zero, one, or more second transactions in response to providing the first transaction to the external logic. The method may, therefore, include providing the second transactions to the physical device.

While the above method is described being provided on a computer-readable medium, it is to be appreciated that other example methods described herein can also be provided on a computer-readable medium.

Figure 12:
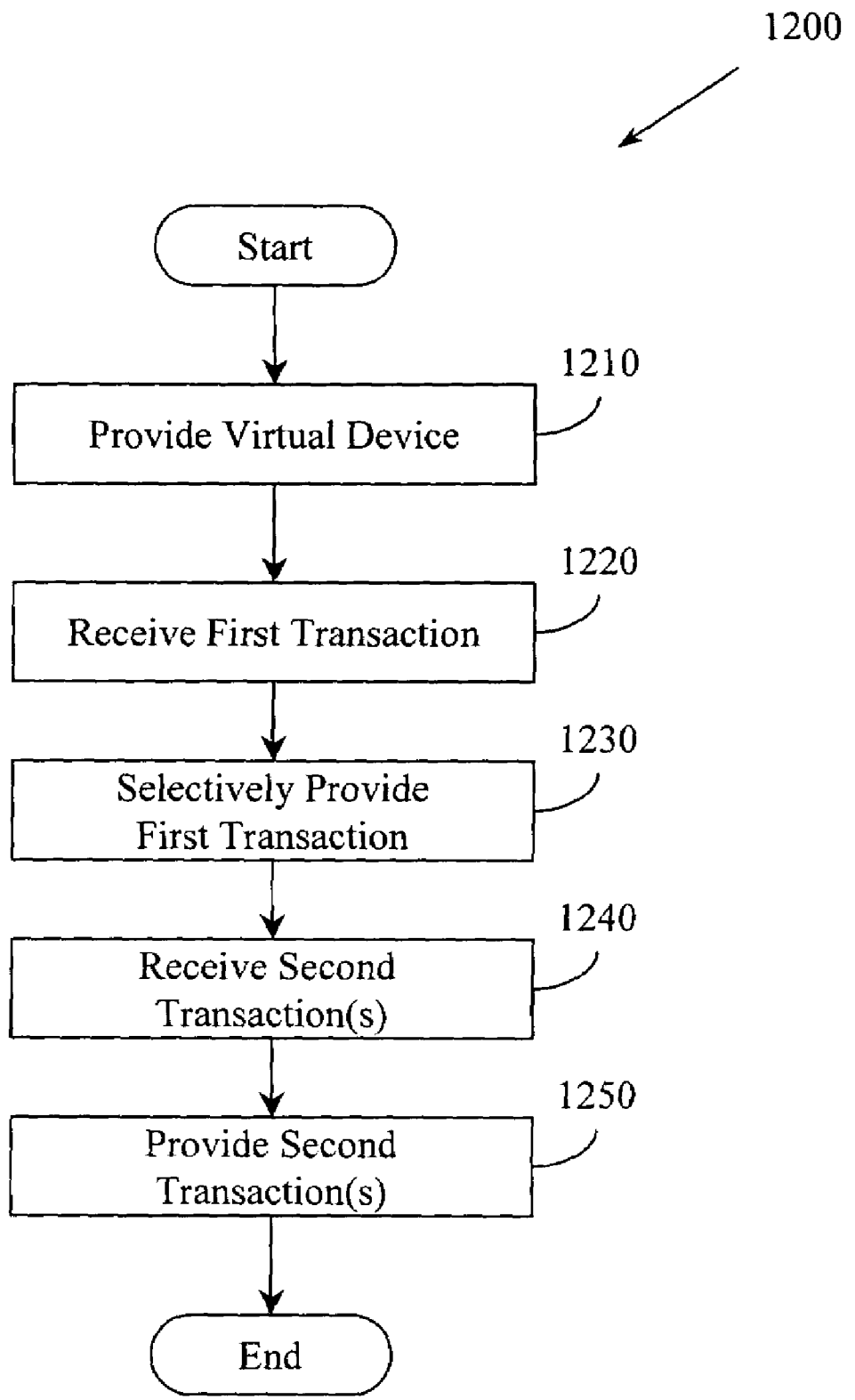
FIG. 12 illustrates an example method associated with providing chip hardware virtualization via external emulation.

A simplified or more general instance of method 600 is illustrated as method 1200 in FIG. 12. Method 1200 facilitates providing external virtualization support to an integrated circuit that implements a physical device, where the integrated circuit is configured without internal virtualization support. Method 1200 includes, at 1210, providing a virtual device that virtualizes a subset of functions provided by the physical device. The virtual device may be implemented, for example, in an external logic.

Method 1200 may also include, at 1220, receiving in the integrated circuit a first transaction intended for the physical device and, at 1230, selectively providing the first transaction to the external logic based. Whether the first transaction is provided to the external logic may be based, for example, on whether the first transaction is related by addressing to the subset of functions virtualized by the virtual device.

Method 1200 may also include, at 1240, receiving from the external logic a second transaction(s) in response to providing the first transaction to the external logic and, at 1250, selectively providing the second transaction(s) to the physical device.

Figure 7:
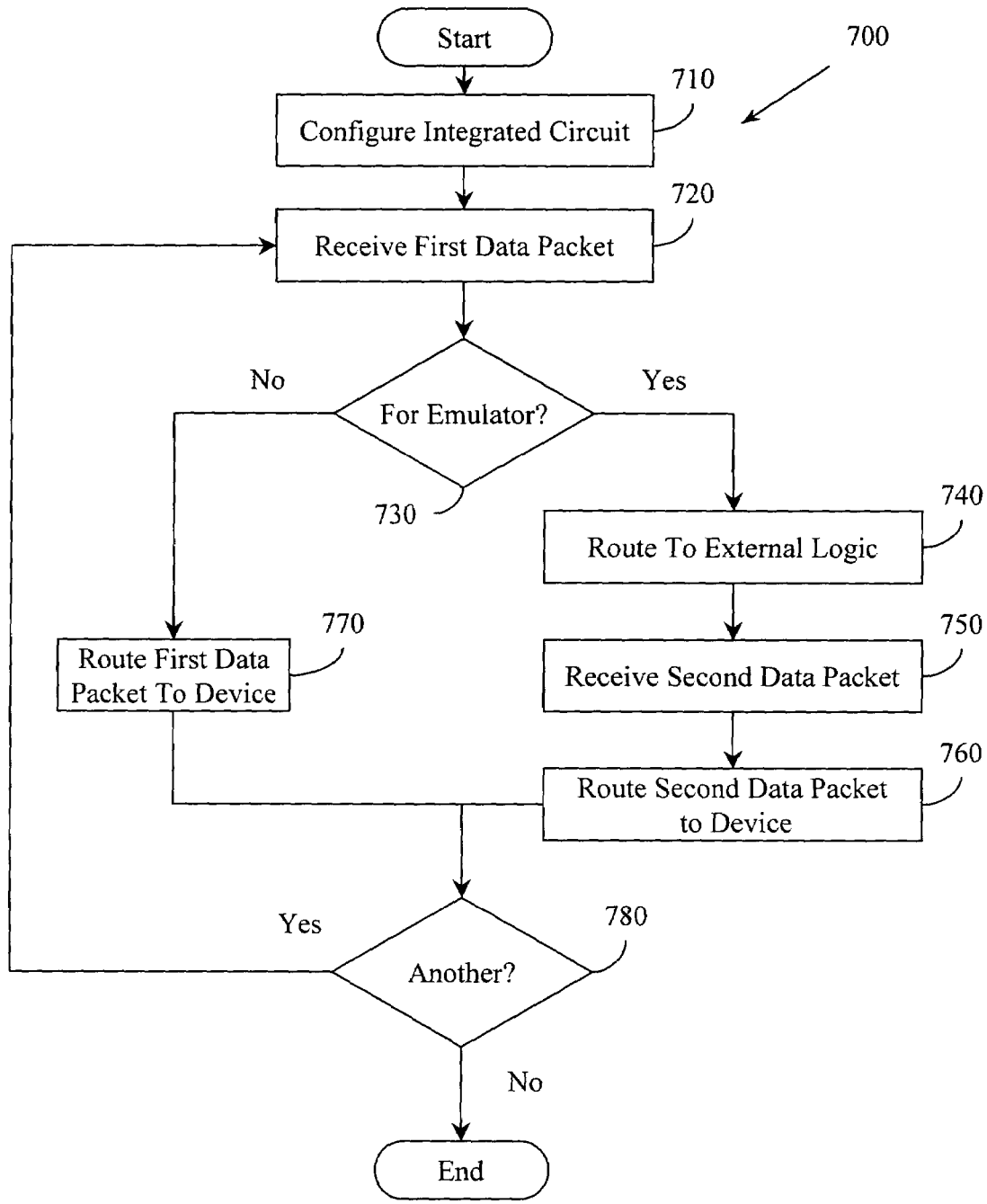
FIG. 7 illustrates another example method associated with providing chip hardware virtualization via external emulation.

FIG. 7 illustrates a method 700 associated with providing chip hardware virtualization via external emulation. Method 700 may include, at 710, configuring an integrated circuit to route a first set of data packets associated with a first set of addresses to a management port and thus to an external logic and to not route a second set of data packets associated with a second set of addresses to the management port. The second set of data packets may instead be routed directly to a physical device implemented by the integrated circuit. The management port may be located in an integrated circuit that implements the physical device.

Method 700 may also include, at 720, receiving, in the integrated circuit, a first data packet associated with an action to be performed by the physical device implemented by the integrated circuit. The first data packet may be associated with, for example, control, data movement, and the like. Control may include, for example, configuration functions while data movement may include, for example, reading and writing data.

Method 700 may also include, at 720, examining a port address associated with the first data packet. The port address may be, for example, a configuration port address, a data path port address, a control port address, and so on. After examining the port address, a determination may be made at 730 concerning whether the data packet should be routed to an external logic that virtualizes the physical device or should be provided to the physical device. If the determination is that the packet is not for the emulator, then at 770 the data packet may be provided to the physical device. If the determination at 730 is that the data packet is for the emulator, then method 700 may include, at 740, selectively providing the first data packet to the external virtualization logic via the management port.

Method 700 may also include, at 750, receiving a second data packet from the external virtualization logic in response to providing the first data packet to the external virtualization logic. For example, the first data packet may be an original configuration transaction that the external logic receives and manipulates to produce a second configuration transaction. By way of illustration, if the external virtualization logic has already initialized a physical device in connection with providing a first instance of a virtual version of the physical device, then a second transaction from a second entity seeking to initialize the physical device may not require the physical device to be initialized, but rather may only require the external logic to present a second instance of the virtual device to the second entity. Thus the second data packet, while related to the first data packet may cause a different action based, for example, on state stored in the external emulator. While a single second data packet is described, it is to be appreciated that there may be a one-to-one, one-to-none, and/or one-to-many relationship between a first data packet and a second data packet.

At 750, a second data packet may be received from the external logic and at 760 the second data packet may be provided to the physical device. As described above, zero or more second data packets may be received from the external logic for first data packets provided to the external logic. The second data packets may be, for example, derived from the first data packet. At 780 a determination may be made concerning whether to process another data packet. If the determination is yes, then processing may return to 720, otherwise processing may conclude.

While FIG. 7 illustrates various actions occurring in serial, it is to be appreciated that various actions illustrated in FIG. 7 could occur substantially in parallel. By way of illustration, a first process could configure an integrated circuit, a second process could receive data packets, and a third process could route data packets. While three processes are described, it is to be appreciated that a greater and/or lesser number of processes could be employed and that lightweight processes, regular processes, threads, and other approaches could be employed. It is to be appreciated that other example methods may, in some cases, also include actions that occur substantially in parallel.

Figure 8:
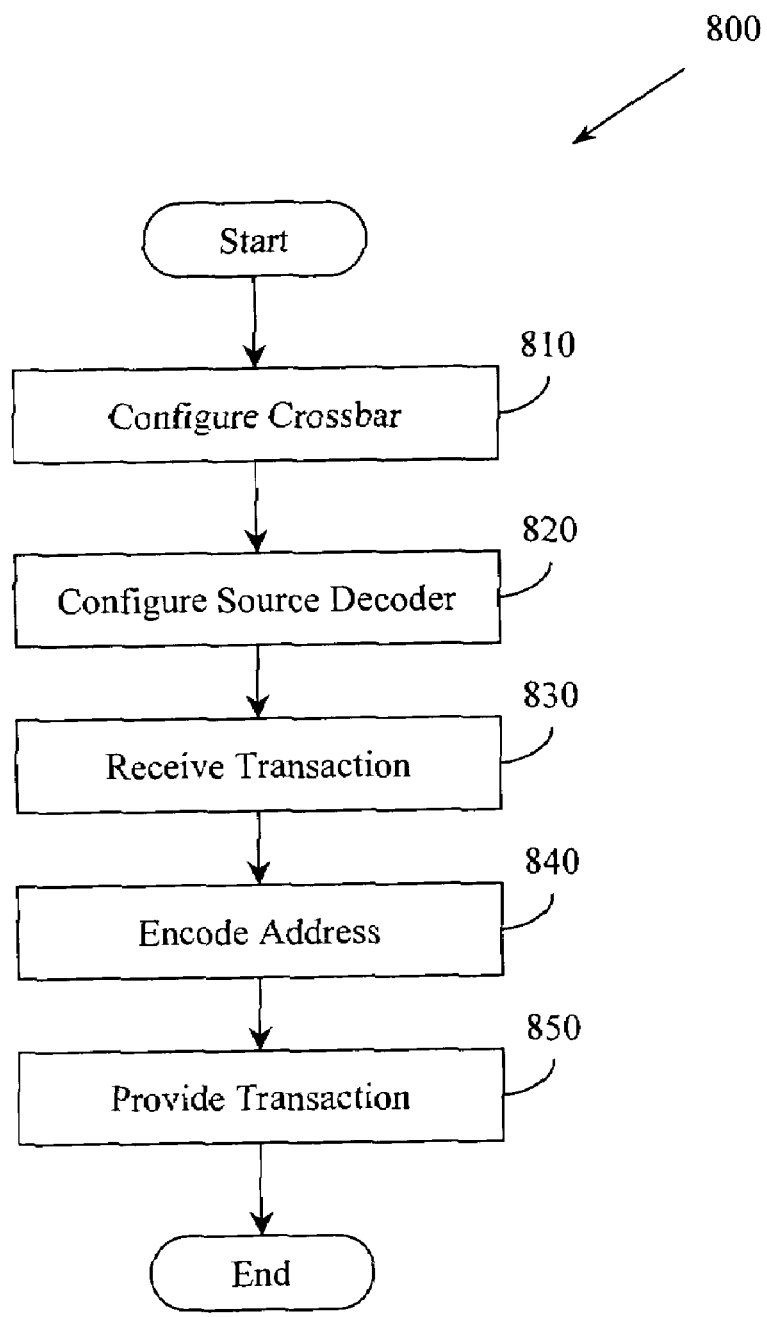
FIG. 8 illustrates another example method associated with providing chip hardware virtualization via external emulation.

FIG. 8 illustrates a method 800 associated with providing chip hardware virtualization via external emulation. Method 800 may include, at 810, configuring a crossbar in an integrated circuit to route a first set of transactions associated with a first set of addresses to a management port. Actions performed at 810 may also include configuring the crossbar to route a second set of transactions associated with a second set of addresses to a logic in the integrated circuit. The first set of transactions may form a portion of a total set of functionality provided by an actual device. The first set of transactions may also correspond to functions virtualized by an external logic. The second set of transactions may also form a portion of the total set of functionality provided by an actual device, but may correspond to functions not virtualized by the external logic.

Method 800 may also include, at 820, configuring a source decoder to manipulate a transaction intended for the integrated circuit to include a port address that is a member of one of the first set of addresses or the second set of addresses. For example, configuration transactions may be manipulated to include a port address that will lead to the transaction being routed to the external virtualization logic while read/write transactions may be manipulated to include a port address that will lead to the transaction being routed to the physical device.

Method 800 may also include, at 830, receiving a transaction configured without an address, and, at 840, adding the port address to the transaction. After receiving and manipulating the transaction, method 800 may include, at 850, providing the transaction to the integrated circuit. Thereafter, the transaction may be processed like methods described in connection with FIGS. 6 and 7.

Figure 13:
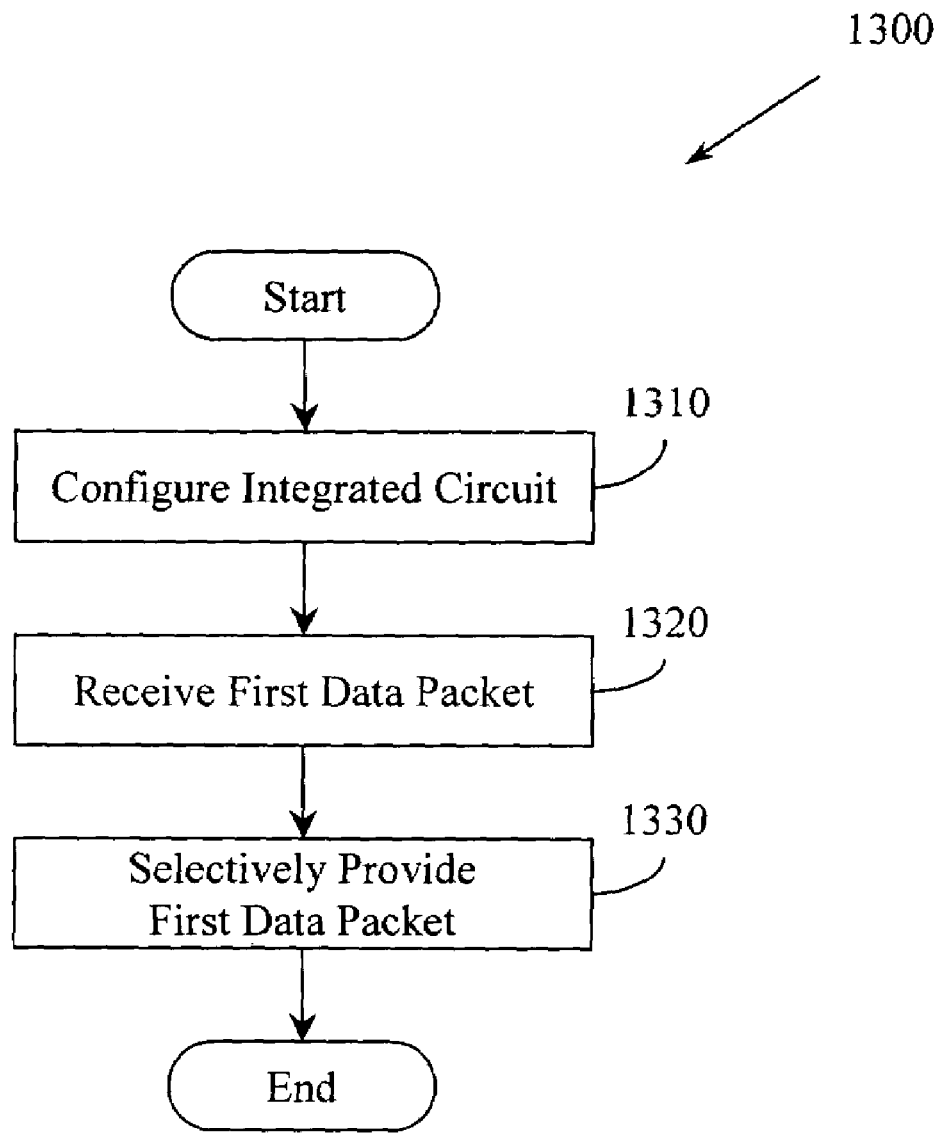
FIG. 13 illustrates an example method associated with providing chip hardware virtualization via external emulation.

A simplified or more general instance of method 800 is illustrated as method 1300 in FIG. 13. Method 1300 facilitates providing chip hardware virtualization via external emulation. Thus method 1300 may include, at 1310, configuring an integrated circuit to direct a first set of data packets associated with a first set of addresses to a management port and to not direct a second set of data packets associated with a second set of addresses to the management port. Having established the packet address based routing, method 1300 may then proceed, at 1320, to receiving, in the integrated circuit, a first data packet associated with an action to be performed by a physical device implemented by the integrated circuit and, at 1330, to selectively providing the first data packet to an external virtualization logic via the management port based, at least in part, on a port address associated with the first data packet.

Figure 9:
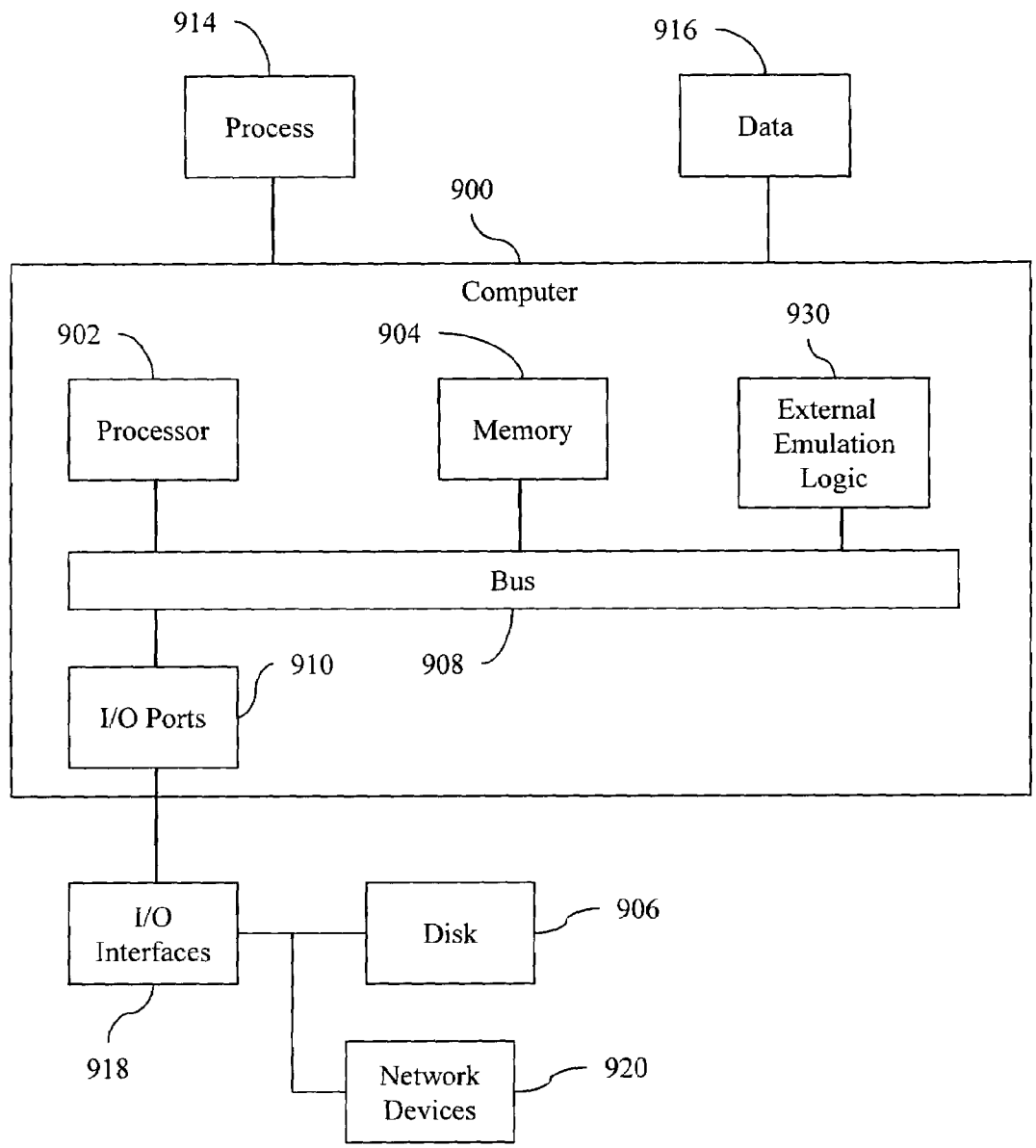
FIG. 9 illustrates an example computing environment in which example systems and methods illustrated herein can operate.

FIG. 9 illustrates a computer 900 that includes a processor 902, a memory 904, and input/output ports 910 operably connected by a bus 908. In one example, computer 900 may include an external emulation logic 930 that is configured to facilitate providing external virtualization support for processor 902 or another logic in computer 900. Thus, external emulation logic 930, whether implemented in computer 900 as hardware, firmware, software, and/or a combination thereof may provide means for providing a virtual device that implements a subset of a set of functions performed by a physical device. The virtual device may be implemented in a second logic (e.g., logic 930) that is separate from a first logic (e.g., processor 902) that implements the physical device. External emulation logic 930 may also provide means for identifying a data packet associated with a member of the subset of the set of functions performed by the physical device and means for selectively providing the data packet to the second logic.

The processor 902 can be a variety of various processors including dual microprocessor and other multi-processor architectures. The memory 904 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 906 may be operably connected to the computer 900 via, for example, an input/output interface (e.g., card, device) 918 and an input/output port 910. The disk 906 can include, but is not limited to, devices like a magnetic disk drive, a solid state disk drive, a floppy disk drive, a tape drive, a Zip drive, a flash memory card, and/or a memory stick. Furthermore, the disk 906 can include optical drives like a CD-ROM, a CD recordable drive (CD-R drive), a CD rewriteable drive (CD-RW drive), and/or a digital video ROM drive (DVD ROM). The memory 904 can store processes 914 and/or data 916, for example. The disk 906 and/or memory 904 can store an operating system that controls and allocates resources of the computer 900.

The bus 908 can be a single internal bus interconnect architecture and/or other bus or mesh architectures. While a single bus is illustrated, it is to be appreciated that computer 900 may communicate with various devices, logics, and peripherals using other busses that are not illustrated (e.g., PCIE, SATA, Infiniband, 1394, USB, Ethernet). The bus 908 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 900 may interact with input/output devices via i/o interfaces 918 and input/output ports 910. Input/output devices can include, but are not limited to, a keyboard, a microphone, a pointing and selection device, cameras, video cards, displays, disk 906, network devices 920, and the like. The input/output ports 910 can include but are not limited to, serial ports, parallel ports, and USB ports.

The computer 900 can operate in a network environment and thus may be connected to network devices 920 via the i/o interfaces 918, and/or the i/o ports 910. Through the network devices 920, the computer 900 may interact with a network. Through the network, the computer 900 may be logically connected to remote computers. The networks with which the computer 900 may interact include, but are not limited to, a local area network (LAN), a wide area network (WAN), and other networks. The network devices 920 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 920 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, and/or through a network may include combinations and mixtures of communications.

Thus, in one example, computer 900 may be a computer configured with a trap mode register, a plurality of interrupt vector address registers, and a plurality of interrupt vector tables. Computer 900 may include an initialization logic (not illustrated) that is configured to initialize the trap mode register, interrupt vector address registers, and interrupt vector table.

Figure 10:
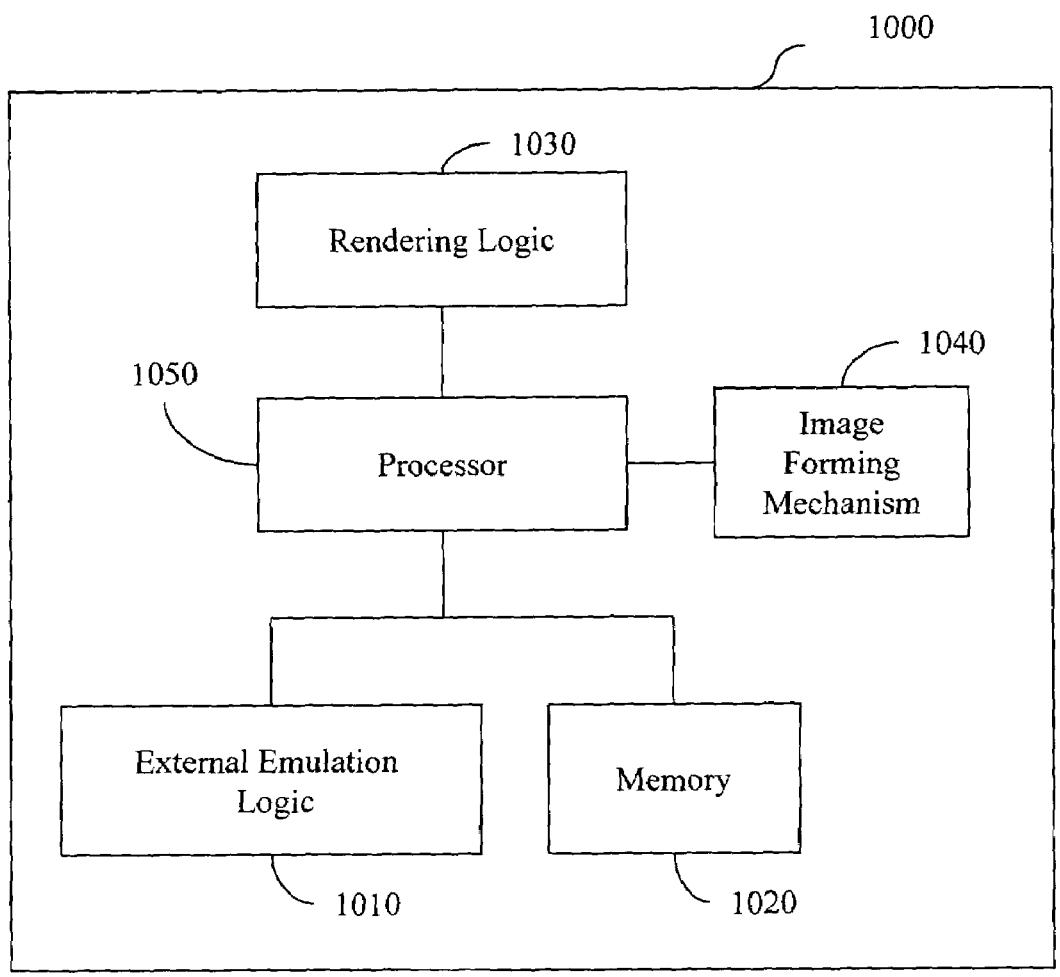
FIG. 10 illustrates an example image forming device in which example systems and methods illustrated herein can operate.

FIG. 10 illustrates an example image forming device 1000 that includes an external emulation logic 1010 configured to implement example systems described herein. The external emulation logic 1010 may also be configured to perform executable methods like those described herein. In one example, the external emulation logic 1010 may be permanently and/or removably attached to the image forming device 1000.

The image forming device 1000 may receive print data to be rendered. Thus, image forming device 1000 may also include a memory 1020 configured to store print data or to be used more generally for image processing. The image forming device 1000 may also include a rendering logic 1030 configured to generate a printer-ready image from print data.

Rendering varies based on the format of the data involved and the type of imaging device. In general, the rendering logic 1030 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 1000 may receive printer-ready data that does not need to be rendered and thus the rendering logic 1030 may not appear in some image forming devices.

The image forming device 1000 may also include an image forming mechanism 1040 configured to generate an image onto print media from the print-ready image. The image forming mechanism 1040 may vary based on the type of the imaging device 1000 and may include a laser imaging mechanism, other toner-based imaging mechanisms, an ink jet mechanism, digital imaging mechanism, or other imaging reproduction engine. A processor 1050 may be included that is implemented with logic to control the operation of the image-forming device 1000. In one example, the processor 1050 includes logic that is capable of executing Java instructions. Other components of the image forming device 1000 are not described herein but may include media handling and storage mechanisms, sensors, controllers, and other components involved in the imaging process.

Figure 11:
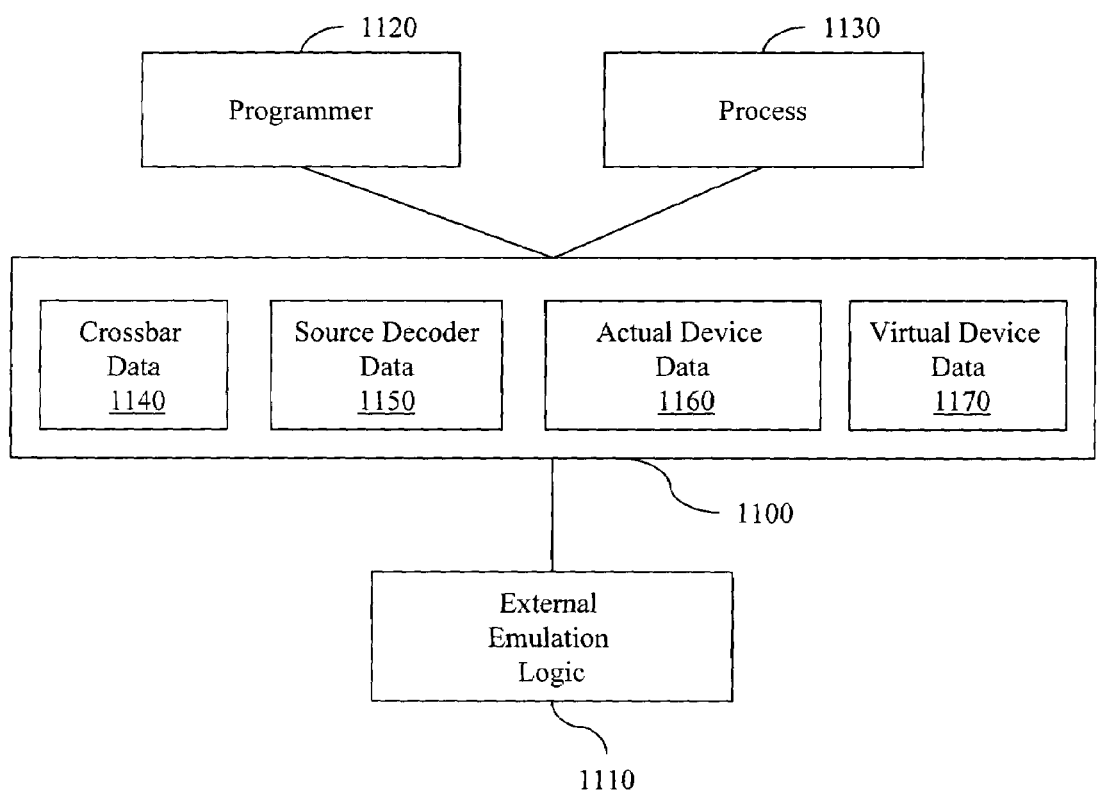
FIG. 11 illustrates an example application programming interface (API).

Referring now to FIG. 11, an application programming interface (API) 1100 is illustrated providing access to an external emulation logic 1110. The API 1100 can be employed, for example, by a programmer 1120 and/or a process 1130 to gain access to processing performed by logic 1110. For example, a programmer 1120 can write a program to access logic 1110 (e.g., invoke its operation, monitor its operation, control its operation) where writing the program is facilitated by the presence of API 1100. Rather than programmer 1120 having to understand the internals of logic 1110, programmer 1120 merely has to learn the interface to logic 1110. This facilitates encapsulating the functionality of logic 1110 while exposing that functionality.

Similarly, the API 1100 can be employed to provide data values to logic 1110 and/or retrieve data values from logic 1110. For example, a process 1130 that maps port addresses based on virtualized functions can provide mapping data to logic 1110 via API 1100 by, for example, using a call provided in API 1100. Thus, in one example of API 1100, a set of application programming interfaces can be stored on a computer-readable medium. The interfaces can be employed by a programmer, computer component, logic, and so on, to gain access to an external emulation logic 1110. The interfaces can include, but are not limited to, a first interface 1140 that communicates a crossbar data and a second interface 1150 that communicates a source decoder data. In one example, the crossbar data may facilitate configuring a crossbar to route a transaction based on the source decoder data. The interfaces may also include a third interface 1160 that communicates a physical device data related to a physical device to which the crossbar may provide a transaction and a fourth interface 1170 that communicates a virtual device data related to a virtual device to which the crossbar may provide a transaction. The virtual device may implement a subset of a set of functions performable by the physical device.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An emulation logic configured to be located outside an integrated circuit I/O adapter, comprising;
    A virtualization logic configured to virtualize a partition of a function performed by the I/O adapter, the partition being identifiable by an address associated with a transaction associated with performing the function;
    The I/O adapter configured to receive transactions associated with performing the function of the I/O adapter, and to route the identified partition of the function of the I/O adapter to the virtualization logic, with the remaining partition of the function performed by the I/O adapter;
    A data store operably connected to the virtualization logic, the data store being configured to store a state data associated with the virtualized partition of the function.

2. The emulation logic of claim 1, the address being one or more of, an operation address, and a control address.

3. The emulation logic of claim 2, the control address being a configuration port address.

4. The emulation logic of claim 1, including a bus controller configured to receive a transaction from the I/O adapter, where the transaction includes an address.

5. The emulation logic of claim 1, the virtualization logic being configured to provide a virtual device related to a physical device provided by the I/O adapter.

6. The emulation logic of claim 5, the virtualization logic and the data store being configured to isolate state data associated with a first instance of the virtual device from state data associated with a second instance of the virtual device provided by the emulation logic.

7. The emulation logic of claim 1, the emulation logic being implemented in a field programmable gate array.

8. A system comprising: an I/O adapter configured to perform a physical operation;
    The I/O adapter being further configured to receive transactions associated with performing the physical operation and to partition the physical operation by identifying a first set of transactions that belong to a first partition based on addresses of the transactions and identifying a second set of transactions that belong to a second partition based on the addresses of the transactions, the I/O adapter being further configured to route the first set of transactions that belong to the first partition to a port and to route the second set of transactions to be performed by the I/O adapter; and An emulation logic located outside the I/O adapter and operably connectable to the I/O adapter via the port, the emulation logic being configured to virtualize the first partition of the physical operation and to perform the first set of transactions of the first partition received through the port.

9. The system of claim 8, where the port is a management port associated with the I/O adapter.

10. The system of claim 8, the emulation logic being implemented in a field programmable gate array.

11. The system of claim 8, the I/O adapter including a host bridge and two or more point-to-point bridges.

12. The system of claim 11, the emulation logic being configured to virtualize at least one subset of physical operations performable by the host bridge.

13. The system of claim 8, where the integrated circuit I/O adapter identifies addresses for the first partition using one or more of, configuration port addressing, input port addressing, or output port addressing.

14. The system of claim 8, the emulation logic including a data store configured to store a state data associated with virtualizing the first partition of the physical operation.

15. The system of claim 8, the integrated circuit I/O adapter including a crossbar configured to route the first set of transactions associated with the first partition of the physical operation to the emulation logic and to route the second set of transactions of the second partition to a logic within the integrated circuit I/O adapter to be performed by the logic.

16. The system of claim 15, the first set of transactions being associated with a configuration operation.

17. The system of claim 16, the second set of transactions being associated with a data transfer operation.

18. A method for providing external virtualization support to the I/O adapter that implements a physical device, where the I/O adapter is configured without internal virtualization support, comprising:
Providing a virtual device that virtualizes a subset of functions provided by the physical device, the virtual device being implemented in an external logic;
receiving in the I/O adapter a first transaction intended for the physical device;
Selectively providing the first transaction to the external logic based, at least in part, on whether the first transaction is related by addressing to the subset of functions virtualized by the virtual device;
Selectively providing the first transaction to the I/O adapter if the first transaction is not related by addressing to the subset of functions virtualized by the virtual device;
Receiving from the external logic in the I/O adapter, one or more second transactions in response to providing the first transaction to the external logic;
Providing the one or more second transactions to the physical device.

19. The method of claim 18, where the subset of functions includes a configuration function.

20. The method of claim 19, where the subset of functions does not include a function in an input/output data path associated with the physical device.

21. The method of claim 18, where the subset of functions comprises an updated version of a previous version of the subset of functions implemented in the I/O adapter.

22. The method of claim 18, where determining whether the first transaction is related to the subset of functions depends, at least in part, on an address associated with the first transaction.

23. The method of claim 22, where the address is a port address.

24. The method of claim 18, where providing a virtual device includes providing a set of addresses implemented in the external logic, the addresses being associated with the subset of functions provided by the physical device, the addresses also being associated with a port.

25. A computer-readable medium storing processor executable instructions operable to perform a method for providing external virtualization support to an I/O adapter that implements a physical device, where the I/O adapter is configured without internal virtualization support, the method comprising:
Providing a virtual device that virtualizes a subset of functions of an operation provided by the physical device, the virtual device being implemented in an external logic;
Receiving in the I/O adapter a set of transactions intended for the physical device to be performed as part of the operation;
Partitioning the operation provided by the physical device by providing selected transactions from the received set of transactions to the external logic based, at least in part, on whether the selected transactions have a predetermined addressing associated with the subset of functions virtualized by the virtual device;
Receiving form the external logic in the I/O adapter, one or more second transactions in response to providing the selected transactions to the external logic; and
Providing one or more second transactions to the physical device.

26. A method comprising:
Partitioning an action performed by an I/O adapter by configuring the I/O adapter to direct a first set of data packets associated with a first set of addresses to a management port and to direct a second set of data packed associated with a second set of addresses to a logic within the I/O adapter;
Receiving, in the I/O adapter, a first data packet associated with the action to be performed by a physical device implemented by the I/O adapter; and
Selectively providing the first data packet to an external virtualization logic via the management port based, at least in part, on a port address associated with the first data packed;
Where the external virtualization logic virtualizes a portion of the action using the first data packet and the logic within the I/O adapter performs other portions of the action.

27. The method of claim 26, where the port address is one or more of, a configuration port address, a data path port address, and a control port address.

28. The method of claim 26, including receiving one or more second data packets from the external virtualization logic in response to providing the first data packet to the external virtualization logic.

29. A method, comprising:
Configuring a crossbar in an I/O adapter to route a first set of transactions associated with a first set of addresses to a management port;
Configuring the crossbar to route a second set of transactions associated with a second set of addresses to a logic in the I/O adapter, where the first and second sets of addresses facilitate partitioning a functionality performed by the logic;
Virtualizing a portion of the functionally by an external device connected to the management port using the first set of transactions and where a second portion of the functionality is performed by the logic in the I/O adapter using the second set of addresses;

Configuring a source decoder to manipulate a transaction intended for the I/O adapter to include a port address that is a member of one of the first set of addresses and the second set of addresses;

Receiving a transaction configured without an address;

Adding a port address to the transaction; and

Providing the transaction to the I/O adapter.

30. A set of application programming interfaces embodied on a computer-readable medium for execution by a computer component in conjunction with providing external virtualization for an input/output adapter, comprising:

a first interface for communicating a crossbar data;

a second interface for communicating a source decoder data, where the crossbar data facilitates configuring a crossbar within the input/output adapter to route selected transactions based on the source decoder data that identifies whether the selected transactions are associated with a selected partition of the input/output adapter, at least by an address;

where the crossbar is configured to route the selected transactions associated with the selected partition to a virtual device that implements the selected partition; and where the crossbar is configured to route transactions not associated with the selected partition to be performed by the input/output adapter.

* * * * *

UNITED STATES PATENT AND TRADEMARK OFFICE
CERTIFICATE OF CORRECTION

PATENT NO. : 7,650,275 B2  Page 1 of 2
APPLICATION NO. : 11/039621
DATED : January 19, 2010
INVENTOR(S) : Russ Herrell et al.

It is certified that error appears in the above-identified patent and that said Letters Patent is hereby corrected as shown below:

In column 16, line 27, in Claim 1, before "I/O" delete "integrated circuit".

In column 16, line 27, in Claim 1, delete "comprising;" and insert -- comprising: --, therefor.

In column 16, line 28, in Claim 1, delete "A" and insert -- a --, therefor.

In column 16, line 32, in Claim 1, delete "The" and insert -- the --, therefor.

In column 16, line 37, in Claim 1, delete "A" and insert -- a --, therefor.

In column 16, line 57, in Claim 8, after "system" insert -- , --.

In column 16, line 59, in Claim 8, delete "The" and insert -- the --, therefor.

In column 17, line 3, in Claim 8, delete "An" and insert --an --, therefor.

In column 17, line 18, in Claim 13, before "I/O" delete "integrated circuit".

In column 17, line 25, in Claim 35, before "I/O" delete "integrated circuit".

In column 17, line 30, in Claim 15, before "I/O" delete "integrated circuit".

In column 17, line 39, in Claim 18, delete "Providing" and insert -- providing --, therefor.

In column 17, line 44, in Claim 18, delete "Selectively" and insert -- selectively --, therefor.

In column 17, line 48, in Claim 18, delete "Selectively" and insert -- selectively --, therefor.

In column 17, line 51, in Claim 18, delete "Receiving" and insert -- receiving --, therefor.

In column 17, line 53, in Claim 18, after "logic;" insert -- and --.

Signed and Sealed this

Fourth Day of May, 2010

David J. Kappos
*Director of the United States Patent and Trademark Office*

CERTIFICATE OF CORRECTION (continued)

U.S. Pat. No. 7,650,275 B2

In column 17, line 54, in Claim 18, delete "Providing" mid insert -- providing --, therefor.

In column 17, line 62, in Claim 21, delete "comprises" and insert -- comprise --, therefor.

In column 18, line 14, in Claim 25, delete "Providing" and insert -- providing --, therefor.

In column 18, line 17, in Claim 25, delete "Receiving" and insert -- receiving --, therefor.

In column 18, line 20, in Claim 25, delete "Partitioning" and insert -- partitioning --, therefor.

In column 18, line 26, in Claim 25, delete "Receiving form" and insert -- receiving from --, therefor.

In column 18, line 29, in Claim 25, delete "Providing" and insert -- providing the --, therefor.

In column 18, line 31, in Claim 26, after "method" insert -- , --.

In column 18, line 32, in Claim 26, delete "Partitioning" and insert -- partitioning --, therefor.

In column 18, line 35, in Claim 26, delete "packed" and insert -- packets --, therefor.

In column 18, line 38, in Claim 26, delete "Receiving," and insert -- receiving, --, therefor.

In column 18, line 41, in Claim 26, delete "Selectively" and insert -- selectively --, therefor.

In column 18, line 44, in Claim 26, delete "packed;" and insert -- packet; --, therefor.

In column 18, line 45, in Claim 26, delete "Where" and insert -- where --, therefor.

In column 18, line 57, in Claim 29, delete "Configuring" and insert -- configuring --, therefor.

In column 18, line 60, in Claim 29, delete "Configuring" and insert -- configuring --, therefor.

In column 18, line 65, in Claim 29, delete "Virtualizing a" and insert -- virtualizing a first --, therefor.

In column 18, line 65, in Claim 29, delete "functionally" and insert -- functionality --, therefor.

In column 19, line 3, in Claim 29, delete "Configuring" and insert -- configuring --, therefor.

In column 19, line 8, in Claim 29, delete "Receiving" and insert -- receiving --, therefor.

In column 19, line 9, in Claim 29, delete "Adding" and insert -- adding --, therefor.

In column 19, line 10, in Claim 29, delete "Providing" and insert -- providing --, therefor.